United States Patent
Katada et al.

(10) Patent No.: US 9,621,015 B2
(45) Date of Patent: Apr. 11, 2017

(54) LINEAR VIBRATION ACTUATOR AND MOBILE COMMUNICATION DEVICE OR GAMING DEVICE INCLUDING THE SAME

(71) Applicant: Nidec Copal Corporation, Itabashi-ku, Tokyo (JP)

(72) Inventors: Yoshinori Katada, Saitama-Ken (JP); Hirohiko Sonoki, Fukushima-Ken (JP); Daisuke Higashi, Saitama-Ken (JP); Risa Matsumura, Saitama-Ken (JP); Sayaka Ueno, Tokyo-To (JP); Honami Nakazawa, Saitama-Ken (JP); Yoshihide Tonogai, Fukushima-Ken (JP)

(73) Assignee: NIDEC COPAL CORPORATION, Itabashi-Ku, Tokyo (JP)

( * ) Notice: Subject to any disclaimer, the term of this patent is extended or adjusted under 35 U.S.C. 154(b) by 245 days.

(21) Appl. No.: 14/180,575

(22) Filed: Feb. 14, 2014

(65) Prior Publication Data

US 2014/0232211 A1  Aug. 21, 2014

(30) Foreign Application Priority Data

Feb. 18, 2013  (JP) .................. 2013-028705
Sep. 19, 2013  (JP) .................. 2013-194516

(51) Int. Cl.
*H02K 33/00* (2006.01)
*H02K 33/16* (2006.01)

(52) U.S. Cl.
CPC ............. *H02K 33/00* (2013.01); *H02K 33/16* (2013.01)

(58) Field of Classification Search
CPC ............................ H02K 33/16; H02K 33/00

USPC .............................................. 310/25, 36, 15
IPC ............................................. H02K 33/16,33/00
See application file for complete search history.

(56) References Cited

U.S. PATENT DOCUMENTS

| 6,249,198 B1* | 6/2001 | Clark ...................... F04B 43/04 310/36 |
| 2010/0066182 A1* | 3/2010 | Yamazaki .............. H02K 33/16 310/29 |
| 2010/0102646 A1* | 4/2010 | Masami ................. H02K 33/16 310/29 |
| 2011/0018366 A1 | 1/2011 | Choi |
| 2011/0068639 A1* | 3/2011 | Choi ...................... H02K 33/16 310/25 |
| 2011/0198949 A1* | 8/2011 | Furuich .................. H02K 33/16 310/25 |

(Continued)

FOREIGN PATENT DOCUMENTS

JP  2011-30403 A  2/2011

*Primary Examiner* — Hanh Nguyen
(74) *Attorney, Agent, or Firm* — Troutman Sanders LLP

(57) ABSTRACT

A linear vibration actuator for which the positional accuracy of coils in the casing can be easily increased. A linear vibration actuator (1) in which a magnet (13) and a weight (15) are fixed. The magnet (13) and the shaft (20) form a magnetic circuit within a casing (2) causing reciprocating motion of the weight (15) and magnet (13), via a coil (24) within a casing (2). The linear actuator (1) includes a shaft (20) provided within the casing (2) and made from a magnetic material. A coil (24) is supported by the shaft (20) includes first and second coil parts (22, 23) arranged parallel to an axial line L and wound in opposing directions. A ring-like magnet (13) surrounds the coil (24) and the shaft (20). A weight is fixed to the magnet (13). A plate spring (17) biases the magnet (13) and the weight (15) along the shaft (20).

8 Claims, 7 Drawing Sheets

(56) References Cited

U.S. PATENT DOCUMENTS

| | | | |
|---|---|---|---|
| 2012/0146557 A1* | 6/2012 | Pyo | G11B 5/1278 318/129 |
| 2012/0319506 A1* | 12/2012 | Shim | H02K 33/16 310/25 |
| 2013/0342034 A1* | 12/2013 | Moon | B06B 1/045 310/25 |

* cited by examiner

LINEAR VIBRATION ACTUATOR AND MOBILE COMMUNICATION DEVICE OR GAMING DEVICE INCLUDING THE SAME

This application claims priority from Japanese patent application serial no. 2013-028705 filed Feb. 18, 2013 and Japanese patent application serial no. 2013-194516 filed Sep. 19, 2013.

FIELD OF THE INVENTION

The present invention relates to a linear vibration actuator that causes vibration using reciprocating motion of a weight.

BACKGROUND OF THE INVENTION

In the past, as technology for this field, there is Japanese Unexamined Patent Application No. 2011-30403. The linear vibration actuator described in this publication causes vertical straight-line vibration of a weight through the interaction of magnetic force from a magnet and an electromagnetic force of a predetermined frequency generated by a coil. The ring-like coil is fixed on a circuit board, and the magnet is fixed at the bottom of a cup-like yoke. An inner circumferential surface of a ring-like weight contacts an outer circumferential surface of the yoke, and the weight is fixed to the yoke by an adhesive agent. Further, a bottom portion of a truncated cone-like coil spring formed from a thin plate is fixed to a bottom surface of a cylindrical casing, and the external surface of the yoke is fixed to a top portion of the spring. The tubular coil is fixed on the circuit board, and is also arranged to move in and out of a gap between the inner circumferential surface of the tubular part of the cup and the outer circumferential surface of the magnet. Consequently, the weight can be caused to vibrate vertically through the interaction of the magnet and the coil by inputting an electrical current of a predetermined frequency through the coil (energizing),

[Patent Document 1] Japanese Unexamined Patent Application No, 2011-30403

SUMMARY OF THE INVENTION

Problem to be Solved by the Invention

However, in the above-described conventional linear vibration actuator, the coil moves in and out of the gap between the inner circumferential surface of the tubular part of the cup-like yoke and the outer circumferential surface of the magnet. Thus, if the coil is not accurately fixed on the circuit board, the coil will lean toward either the inner circumferential surface side of the tubular part of the yoke or the outer circumferential surface side the magnet. As a result, if the arrangement is subject to a dropping impact, the coil is highly likely to collide with either the inner circumferential surface of the yoke or the outer circumferential surface of the magnet. Hence, to ensure that the coil is fixed in a precise position in the casing, the coil must be fixed in the precise position on the circuit board in advance, prior to assembling the actuator. As a measure to implement this, a special configuration for setting the coil position is required either on the circuit board side or the coil side. If such measures are not implemented, a special tool will be required to accurately fix the coil on the circuit board. Consequently, there is a problem in that it is difficult to increase the positional accuracy of the coil in the casing.

It is the object of the present invention to provide a linear vibration actuator for which the positional accuracy of the coil in the casing can be easily increased.

The present invention is a linear vibration actuator in which a magnet and weight are fixed, and which causes reciprocating motion of the weight and magnet using a coil within a casing, the linear vibration actuator including:

a shaft provided standing within the casing, the shaft being made of a magnetic material and forming a magnetic circuit;

a coil supported by the shaft;

a ring-like magnet arranged to surround the coil and the shaft;

a weight fixed to the magnet; and a biasing unit arranged within the casing and biasing the magnet and the weight in an axial line direction of the shaft.

In the linear vibration actuator, the magnetic circuit is formed between the magnet and the shaft, and the coil is arranged so as to be supported by the shaft that forms one part of the magnetic circuit, and to be wound around and centered on the shaft. As a result, the shaft can be usefully employed to position the coil. Specifically, in the present invention, the coil position can be determined based on the shaft standing within the casing, making it possible to easily improve the positioning accuracy of the coil within the casing.

Also, the ring-like weight is fixed to the outer circumferential surface of the magnet, and the gap between the outer circumferential surface of the weight and the casing is narrower than the gap between the inner circumferential surface of the magnet and the outer circumferential surface of the coil.

When such a construction is used, the outer surface of the coil and the inner circumferential surface of the magnet will not collide even if a collision occurs between the outer circumferential surface of the weight and the inner surface of the casing during a dropping impact. Hence, it becomes less likely that wires will break in the coil under a dropping impact.

Further, a bobbin wound with the coil is provided around shaft, the bobbin being provided with a segment part protruding towards the inner circumferential surface of the magnet. The segment part protrudes from the outer circumferential surface of a first coil part and a second coil part that are wound in opposing directions on the bobbin.

This construction enables the effective use of the segment part to divide the first coil part and the second coil part. Specifically, in an impact caused by dropping, the free end of the segment part will collide with the inner circumferential surface of the magnet. Hence the situation whereby the coil and the magnet collide never arises and it is less likely that wires in the coil will break when the arrangement is dropped. Note also that the segment part makes it easier to wind coil wire in different winding directions to the bobbin.

Further, the weight has formed therein a concave part for mass adjustment of the weight, in a flat surface perpendicular to an axial line.

When such a construction is used, vibration problems caused by individual differences in the weights or biasing unit can be easily adjusted on the weight side, without adjusting the biasing force of the biasing unit, by inserting a filling liquid (such as a mixture of tungsten powder and adhesive agent) into the concave part provided in the weight.

Further, the magnet has a pair of opposing ring-like flat surface parts, the yoke not being fixed to either of the flat surface parts.

When such a construction is used, the thrust of the weight fixed to the magnet can be increased over that in a linear vibration actuator of the type in which the yoke is fixed to the flat surface parts. As a result, efficient vibration can be obtained.

According to the present invention, the positional accuracy of the coil within the casing can be easily increased.

DETAILED DESCRIPTION OF THE PREFERRED EMBODIMENTS

The following is a detailed description of preferred embodiments of the linear vibration actuator of the present invention with reference to the drawings.

First Embodiment

Figure 1:
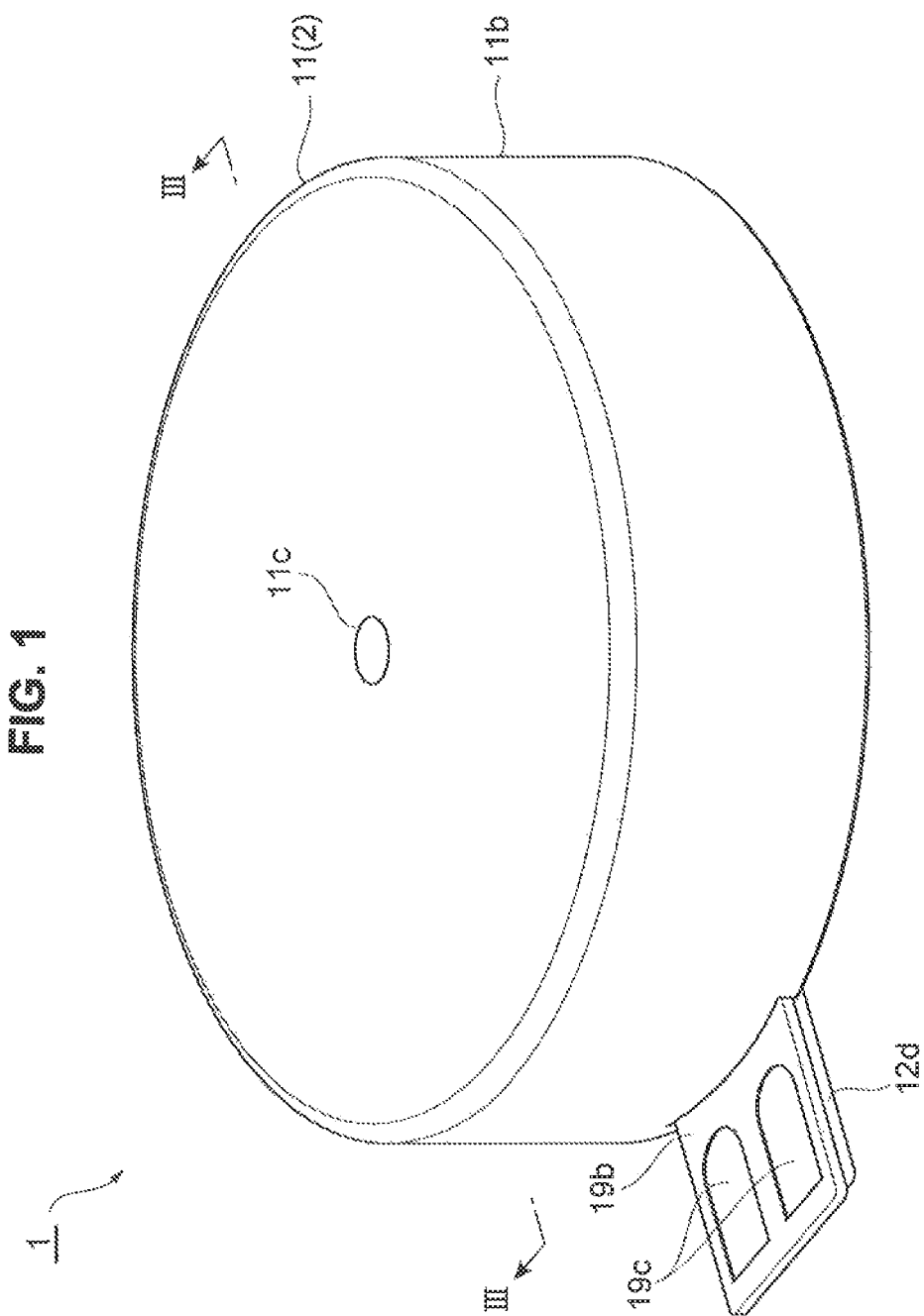
FIG. 1 is an external appearance perspective view illustrating the first embodiment of the linear vibration actuator according to the present invention.
Figure 2:
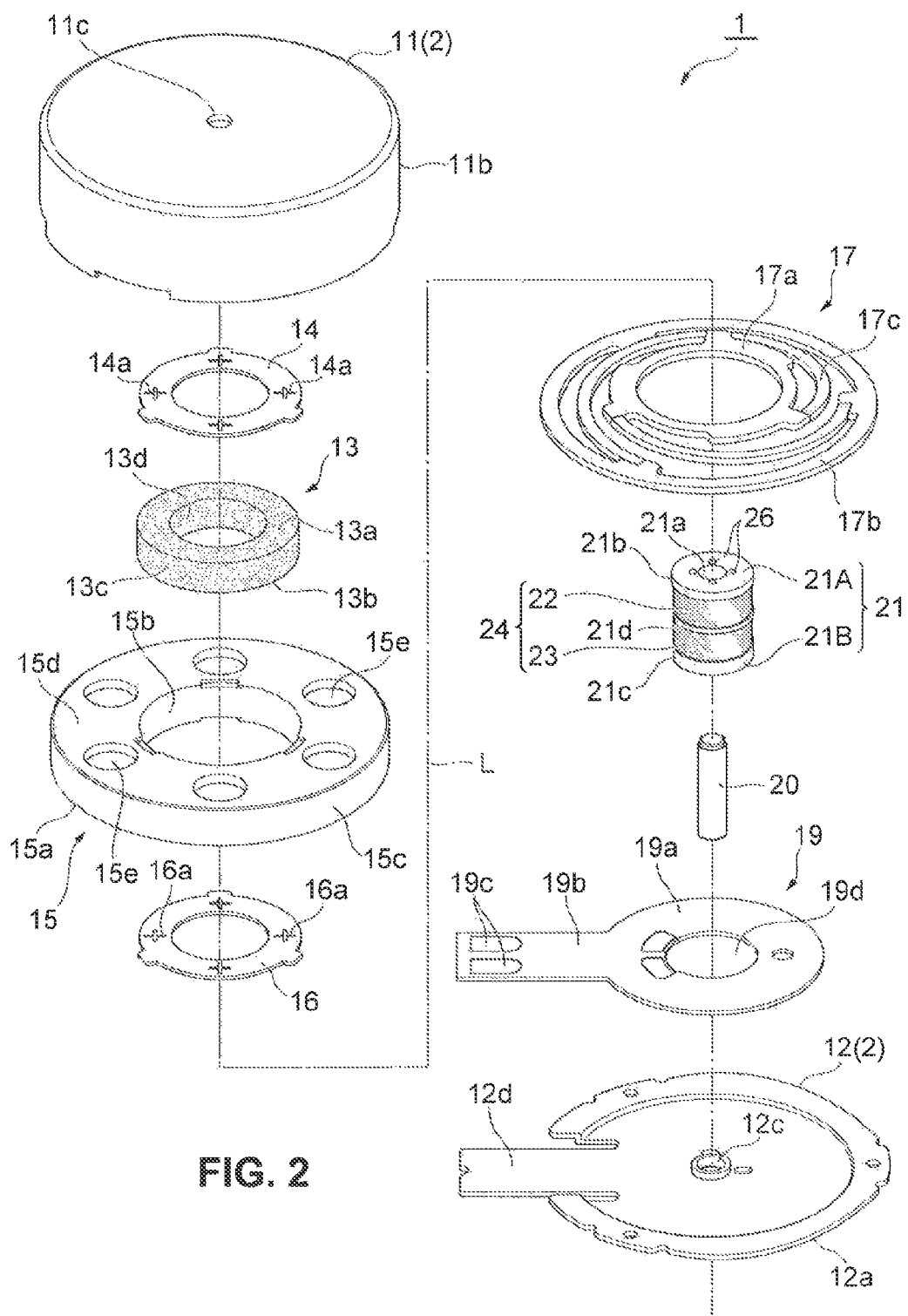
FIG. 2 is an exploded perspective view of the vibration actuator illustrated in FIG. 1.
Figure 3:
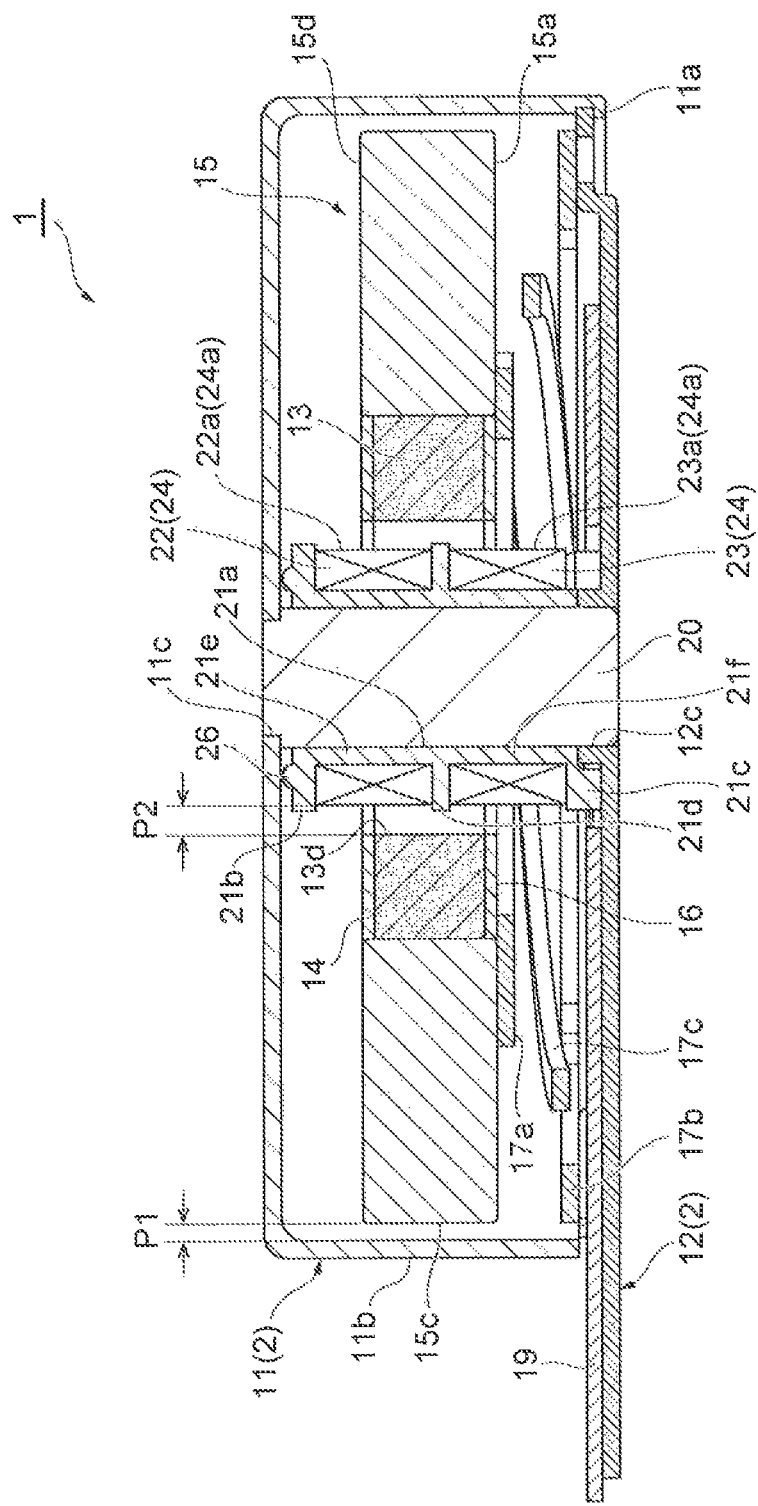
FIG. 3 is a cross-sectional view along line III-III in FIG. 1.

As illustrated in FIG. 1 to FIG. 3, a compact linear vibration actuator 1 is built into a communication device such as a mobile communication device (e.g. a cell phone), is used as a vibration generator for the calling function, and has a coin form with a diameter of approximately 10 mm and a thickness of approximately 3 mm.

A casing 2 of the linear actuator 1 is formed from a cup-like upper casing part 11 formed from a non-magnetic material (such as stainless steel) and a lower casing part 12 with a disc-like shape in a non-magnetic material (such as stainless steel) for closing the open side of the upper casing part 11. The lower casing part 12 is fitted inside the circular-form open end of the upper casing part 11, and the open end of the upper casing part 11 is then bent inwards. Note also that the upper casing part 11 may be welded to the lower casing part 12.

The casing 2 houses a ring-like magnet 13 magnetized along an axial line L direction of the shaft 20 to give an N pole and a S pole. Yokes 14 and 16 formed from thin ring-like magnetic bodies are fixed using an adhesive agent to flat surface parts 13a and 13b of the magnet 13 so as to oppose each other vertically across the magnet 13. Note also that in the yokes 14 and 16, cross-like adhesive agent filling holes 14a and 16a are formed at four locations in a circumferential direction thereof. As a result, the adhesive effect of the adhesive agent can be increased.

An inner circumferential surface 15b of the donut-like weight 15 is adhered using an adhesive agent to the outer circumferential surface 13c of the magnet 13. The weight 15 is made, for example, from tungsten, and a needle is formed by the magnet 13, yokes 14 and 16 and weight 15. A thin plate spring 17, an example of the biasing unit, is fixed by welding to the lower side flat surface part 15a of the weight 15.

The plate spring 17 is formed by a ring-like upper side seat part 17a with a small diameter, a lower side seat part 17b with a large diameter, and an arc-like elastic section 17c linking the upper side seat part 17a and the lower side seat part 17b. Then, the upper side seat part 17a is welded to the lower side flat surface part 15a of the weight 15 and the lower side seat part 17b is welded to the inner wall surface of the lower casing part 12.

The lower casing part 12 includes a circular disc-like main body part 12a of a form that matches the open end of the upper casing part 11 and a tongue piece 12d that protrudes in a radial direction from the main body part 12a. A flexible circuit board 19 is fixed to the inner wall surface of the lower casing part 12. The flexible circuit board 19 includes a ring-like main body part 19a mounted on the inner wall surface of the lower casing part 12 and an extending part 19b mounted on a tongue piece 12d of the lower casing part 12. Further, an opening part 19d for passing through a bobbin 21 and a shaft 20 is formed in the main body part 19a, an electrical supply terminal 19c is provided in the extending part 19b, and the electrical terminal 19c is exposed to the outside.

At the center of the main body part 12a of the lower casing part 12, a press fitting hole 12c for providing the shaft 20 in a standing arrangement is provided. The shaft 20 is formed from a magnetic body and supports the bobbin 21, which is made of resin. The bobbin 21 includes a center hole 21a for insertion of the shaft 20, flange parts 21b and 21c positioned at the two ends in an axial line L direction, and a flange-like segment part 21d positioned between the flange parts 21b and 21c. Further, a first bobbin part 21A is configured by the flange part 21b, the segment part 21d and a support 21e, and a second bobbin part 21B is configured by the flange part 21c, the segment part 21d and a support 21f, and the first bobbin part 21A and the second bobbin part 21B are arranged to be parallel with the axial line L direction. The shaft 20 is press fitted or inserted with extremely low error into the center hole 21a that pierces the support 21e and the support 21f.

A coil 24 is formed from a first coil part 22 configured by winding coil wire on the support 21e of the first bobbin part 21A, and a second coil part 23 configured by winding coil wire on the support 21f of the second bobbin part 21B in the opposite direction to the first coil part 22. The first coil part 22 and the second coil part 23 are arranged to be parallel with the axial line L direction. Further the coil wire of the first coil part 22 and the coil wire of the second coil part 23 are connected in series, and the coil 24 is connected to the flexible circuit board 19.

The ring-like magnet 13 is arranged to surround the coil 24 supported by the shaft 20, with the axial line L at the center thereof, and supported within the casing 2 by a plate spring 17. The plate spring 17 is a compression spring, biasing the magnet 13 and a weight 15 in the axial line L direction of the shaft 20. When the power supply is off, the magnet 13 is arranged to straddle the first coil part 22 and the second coil part 23 so that the inner circumferential surface 13d of the magnet 13 and the segment part 21d of the bobbin 21 oppose each other.

In such a linear vibration actuator 1, a magnetic circuit is formed by the magnet 13 and the shaft 20, and the coil 24 wound on the bobbin 21 is supported by the shaft 20 that forms one part of the magnetic circuit, and is wound around and centered on the shaft 20. As a result, the shaft 20 can be effectively used to determine the position of the coil 24. Specifically, the coil 24 position can be determined based on the shaft 20 standing within the casing 2, making it possible to easily improve the positioning accuracy of the coil 24 within the casing 2 and making it easier to fit the bobbin 21 in the linear actuator 1.

A gap P1 between an outer circumferential surface 15c of the weight 15 surface and a circumferential wall 11b of the upper casing part 11 of the casing 2 is narrower than a gap P2 between the inner circumferential surface 13d of the magnet 13 and the outer circumferential surface 24a of the coil 24. When such a construction is used, the outer circumferential surface 24a of the coil 24 and the inner circumferential surface 13d of the magnet 13 will not collide even if a collision occurs between the outer circumferential surface 15c of the weight 15 and the circumferential wall 11b of the casing 2 during a dropping impact. Hence, it becomes less likely that wires will break in coil 24 under a dropping impact.

The flange-like segment part 21d of the bobbin 21 protrudes from the outer circumferential surfaces 22a and 23a of the first coil part 22 and the second coil part 23. This construction enables the effective use of the segment part 21d to divide the first coil part 22 and the second coil part 23. Specifically, in an impact caused by dropping, the free end of the segment part 21d will collide with the inner circumferential surface 13d of the magnet 13. Hence the situation whereby the coil 24 and the magnet 13 collide never arises and it is less likely that wires in the coil 24 will break when the arrangement is dropped. Note also that the segment part 21d makes it easier to wind coil wire in different winding directions on the bobbin 21.

The weight 15 has formed therein concave parts 15e for mass adjustment of the weight 15, in an upper side flat surface part 15d perpendicular to the axial line L. When such a construction is used, vibration problems caused by individual differences in the weight 15 or plate spring 17 can be easily adjusted on the weight 15 side, without adjusting the spring force of the plate spring 17, by inserting a filling liquid (such as a mixture of tungsten powder and adhesive agent) into the concave parts 15e provided in the weight 15.

When a voltage of a predetermined frequency (such as 5 V, 200 Hz) is input from the electrical supply terminal 19c to the coil 24 (energized), the weight 15 vibrates along the axial line L direction via the plate spring 17. However, if the weight 15 is too light or too heavy, the weight 15 may not vibrate within the casing 2 or may not provide the desired vibration. As a correction measure in such cases, the concave parts 15e for mass adjustment is formed at equal intervals in the upper side flat surface part 15d of the weight 15. By inserting the filling liquid described above, the mass of the weight 15 can be increased to facilitate smooth vibration of the weight 15 at the frequency inputted to the coil 24. Note that the correction measure in this case is not applicable to a case in which the weight 15 is too heavy and fails to vibrate.

After manufacture, the linear actuator 1 is inspected in a state with the upper casing part 11 removed, and linear actuators 1 that do not vibrate appropriately are corrected in the manner described above.

The two ends of the shaft 20 are press-fitted into the press fitting hole 11c of the upper casing part 11 and the press fitting hole 12c of the lower casing part 12 respectively, and the shaft 20 is thereby provided standing in the center of the casing 2. At the flat end surfaces of the flange part 21b of the bobbin 21 supported by the shaft 20, hemispherical convex parts 26 are provided at equally spaced intervals in the circumferential direction. The convex parts 26, which are made from resin, allow the bobbin 21 to be securely fitted between the upper casing part 11 and the lower casing part 12 as result of contact with the inner wall surface of the upper casing part 11 during assembly. As a result of this arrangement, play in the bobbin 21 is suppressed and the anti-noise properties and resistance to dropping impacts can be improved.

Second Embodiment

Figure 4:
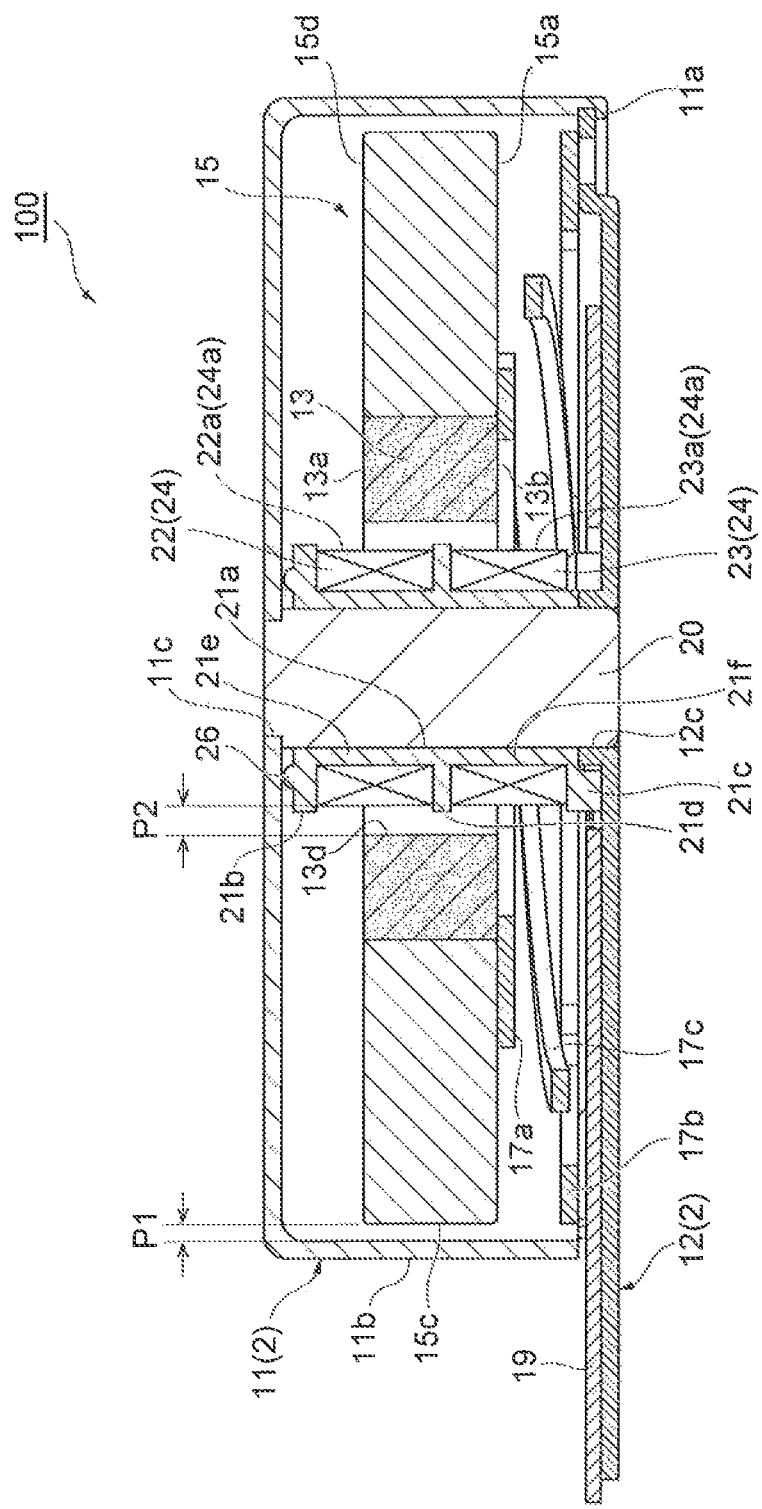
FIG. 4 is a cross-sectional view illustrating a 2nd embodiment of the linear vibration actuator according to the present invention.

The linear vibration actuator 100 according to the 2nd embodiment illustrated in FIG. 4 differs from the linear vibration actuator 1 of the 1st embodiment in that the yokes 14 and 16 used in the 1st embodiment are not fixed to the pair of opposing ring-like flat surface parts 13a and 13b of the magnet 13. Note that other elements of the linear vibration actuator 100 of the 2nd embodiment are identical to those of the linear vibration actuator 1 of the 1st embodiment, and so the same symbols are allocated to these elements in FIG. 4 and descriptions of them are omitted.

Figure 5A:
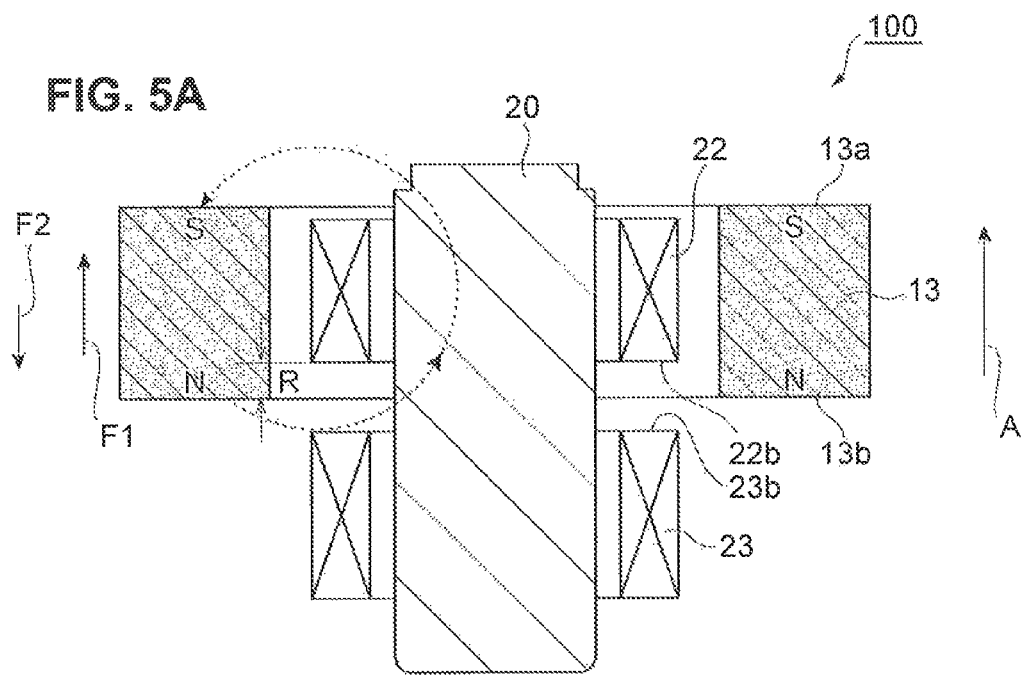
FIG. 5A is a cross-sectional view illustrating a comparison between the type in which the yoke is not fixed to the magnet and FIG. 5B is a cross-sectional view illustrating the type in which the yoke is fixed to the magnet.
Figure 5B:
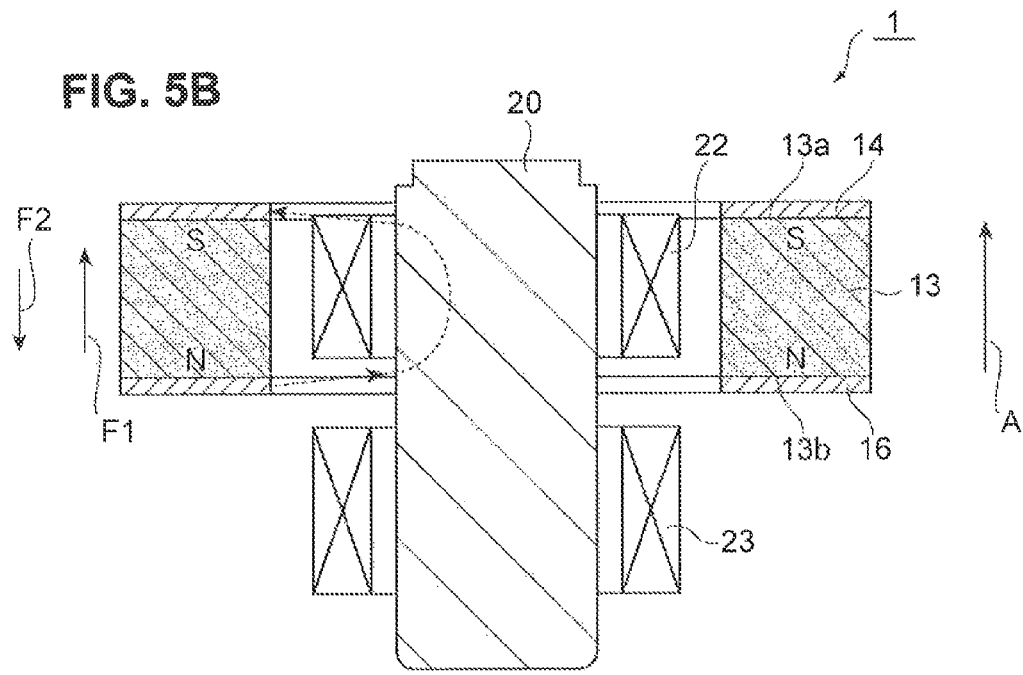

As illustrated in FIG. 5B, when the magnet 13 is at the position of maximum movement in the linear vibration actuator 1, which is to say when the magnet 13 is furthest towards one end, such as the uppermost end, the use of the yokes 14 and 16 allows the magnetic flux from the magnet 13 to the shaft 20 to take the shortest path. As a result, a magnetic circuit of high efficiency is formed. However, for the magnetic flux from the flat surface part 13b on the lower side of the magnet 13 to the shaft 20, a higher proportion of the magnetic flux passes through the first coil part 22 and, consequently, a thrust F2 opposing a thrust F1 becomes larger. As a result, the thrust F2 acts strongly as a brake on the thrust F1 and reduces the thrust of the magnet 13 in the direction of arrow A. This effect makes it more difficult to achieve high-efficiency vibration using the weight 15.

By contrast, as illustrated in FIG. 5A, when the magnet 13 is at the position of maximum movement in the linear vibration actuator 100, which is to say when the magnet 13 is furthest towards one end, such as the uppermost end, because the yokes 14 and 16 are not used, the magnetic flux from the magnet 13 to the shaft 20 does not try to take the shortest path in the same manner as when the yokes 14 and 16 were present. As a result, for the magnetic flux from the flat surface part 13b on the lower side of the magnet 13 to the shaft 20, a lower proportion of the magnetic flux passes through the first coil part 22 and, consequently, the thrust F2 opposing the thrust F1 is less than with the vibration actuator 1 (see FIG. 5B). As a result, the thrust F2 acts less as a brake on the thrust F1 and the thrust of the magnet 13 in the direction of arrow A is increased. This in turn makes it easier to achieve high-efficiency vibration using the weight 15.

When looking to increase the vibration efficiency of the linear vibration actuator 100, the effect of the distance R between a bottom end 22b of the first coil part 22 and the flat surface part 13b of the bottom side of the magnet 13 is important. The larger distance R becomes, the smaller the proportion of the magnetic flux, of the magnetic flux going from the flat surface part 13b of the bottom side of the magnet 13 towards the shaft 20, that passes through the first coil part 22. This effect is useful for increasing the efficiency of vibration using the weight 15. Note also that, although not shown in the drawings, the same effect applies to the lowermost end of the magnet 13. The larger the distance between a top end 23b of the second coil part 23 and a flat surface part 13a of the top side of the magnet 13 becomes, the greater the advantage in increasing the vibration efficiency using the weight 15.

Based on the above-described results, it can be stated that the thinner the magnet 13, the greater the disadvantage resulting from the yokes 14 and 16 becomes. Thus, when the magnet 13 is made thinner to increase the distance of reciprocating movement of the magnet 13, it is advantageous to use a linear vibration actuator of the type of linear vibration actuator 100 without the yokes 14 and 16.

Note that although the weight 15 has been omitted from the FIGS. 5A and 5B, the linear vibration actuators 1 and 100 do of course include the weight 15.

Figure 6:
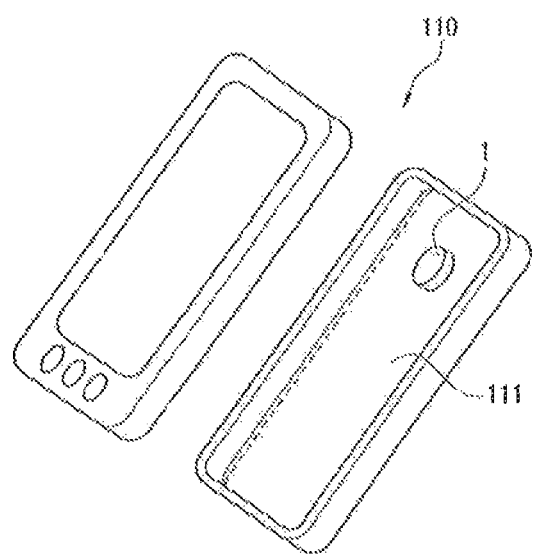
FIG. 6 is a view illustrating a mobile communication device including the linear vibration actuator.

As illustrated in FIG. 6, the linear vibration actuator 1 can be mounted within a casing of a smartphone 110 to form a mobile communication device having a vibration notification function. By electrically connecting a circuit board 111 of the smartphone 110 with the electrical supply terminal 19c of the flexible circuit board 19 of the linear vibration actuator 1, it is possible to use the linear vibration actuator 1 as a vibration generator. For example, vibrations may be generated when an incoming call reaches the mobile communication device, or an operation is performed on the mobile communication device.

Figure 7:
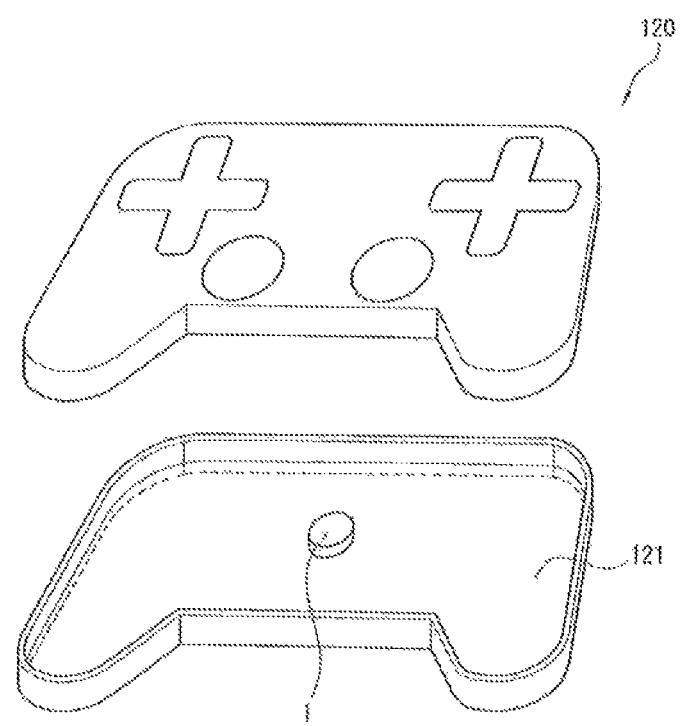
FIG. 7 is a view illustrating a gaming device including the linear vibration actuator.

Also, as illustrated in FIG. 7, the linear vibration actuator 1 can be mounted within a casing of a controller 120 of a game machine to form a gaming device having a vibration notification function. By electrically connecting a circuit board 121 of the controller 120 with the electrical supply terminal 19c of the flexible circuit board 19 of the linear vibration actuator 1, it is possible to use the linear vibration actuator 1 as a vibration generator. The gaming device may be a mobile gaming machine, a steering wheel or the like of a personal computer or the like. In this case, vibrations are generated according to the situation in the game to enhance a sense of reality for the user.

The present invention is not limited to the above-described embodiments, and the following modifications are possible without departing from the spirit of the present invention.

For example, for the biasing unit, the plate spring 17 could be appropriately replaced with a compression coil spring.

DESCRIPTION OF THE SYMBOLS 1, 100 Linear vibration actuator, 2 casing, 13 magnet, 14 and 16 yoke, 15 weight, 15e concave part, 17 plate spring (biasing unit), 20 shaft, 21 bobbin, 21d segment part, 22 first coil part, 23 second coil part, 24 coil, L axial line, P1 and P2 gap.

The invention claimed is:

1. A linear vibration actuator in which a magnet and a weight are fixed, and the magnet causes reciprocating motion of the weight and the magnet using a coil within a casing, the linear vibration actuator comprising:
  a shaft provided standing within the casing, the shaft being made of a magnetic material and forming a magnetic circuit;
  a coil supported by the shaft;
  the magnet, magnetized in an axial direction parallel to an axial line direction of the shaft, being a ring-like magnet arranged to surround the coil and the shaft and comprising a pair of yokeless opposing ring-like flat surface parts;
  wherein the weight being fixed to the magnet; and
  a biasing unit arranged within the casing, and biasing the magnet and the weight in the axial line direction of the shaft.

2. The linear vibration actuator of claim 1 wherein the weight is a the ring-like weight which is fixed to an outer circumferential surface of the magnet, and a gap between the outer circumferential surface of the weight and the casing is narrower than a gap between an inner circumferential surface of the magnet and an outer circumferential surface of the coil.

3. The linear vibration actuator of claim 1, wherein the weight has formed therein a concave part for mass adjustment of the weight, in a flat surface perpendicular to the axial line direction.

4. The linear vibration actuator of claim 1, wherein the linear vibration actuator is incorporated into a mobile communication device.

5. The linear vibration actuator of claim 1, wherein the linear vibration actuator is incorporated into a gaming device.

6. A linear vibration actuator in which a magnet and a weight are fixed, the magnet causes reciprocating motion of the weight and the magnet uses a coil within a casing, the linear vibration actuator comprising:
  a shaft provided standing within the casing, the shaft being made of a magnetic material and forming a magnetic circuit;
  a coil supported by the shaft;
  the magnet being a ring-like magnet arranged to surround the coil and the shaft;
  the weight being fixed to the magnet;
  a biasing unit arranged within the casing, and biasing the magnet and the weight in an axial line direction of the shaft; and
  a bobbin made of resin and wound with the coil is provided around the shaft, the bobbin comprising a segment part protruding towards the inner circumferential surface of the magnet, and the segment part protruding from the outer circumferential surface of a first coil part and a second coil part that are wound in opposing directions on the bobbin.

7. A mobile communication device comprising a linear vibration actuator in which a ring-like magnet and a weight are fixed, and the magnet causing reciprocating motion of the weight and the magnet using a coil within a casing, the linear vibration actuator comprising:
  a shaft provided within the casing, and the shaft being made of a magnetic material and forming a magnetic circuit;
  a coil supported by the shaft;
  the magnet, magnetized in an axial direction parallel to an axial line direction of the shaft, being arranged to surround the coil and the shaft and comprising a pair of yokeless opposing ring-like flat surface parts;
  wherein the weight being fixed to the magnet; and
  a biasing unit arranged within the casing for biasing the magnet and the weight in the axial direction of the shaft.

8. A gaming device comprising the linear vibration actuator in which a ring-like magnet and a weight are fixed, and the magnet causing reciprocating motion of the weight and the magnet using a coil within a casing, the linear vibration actuator comprising:
  a shaft provided within the casing, and the shaft being made of a magnetic material and forming a magnetic circuit;
  a coil supported by the shaft;

the magnet, magnetized in an axial direction parallel to an axial line direction of the shaft, being arranged to surround the coil and the shaft and comprising a pair of yokeless opposing ring-like flat surface parts;

wherein the weight being fixed to the magnet; and a biasing unit arranged within the casing for biasing the magnet and the weight in the axial direction of the shaft.

* * * * *